Figure 1:
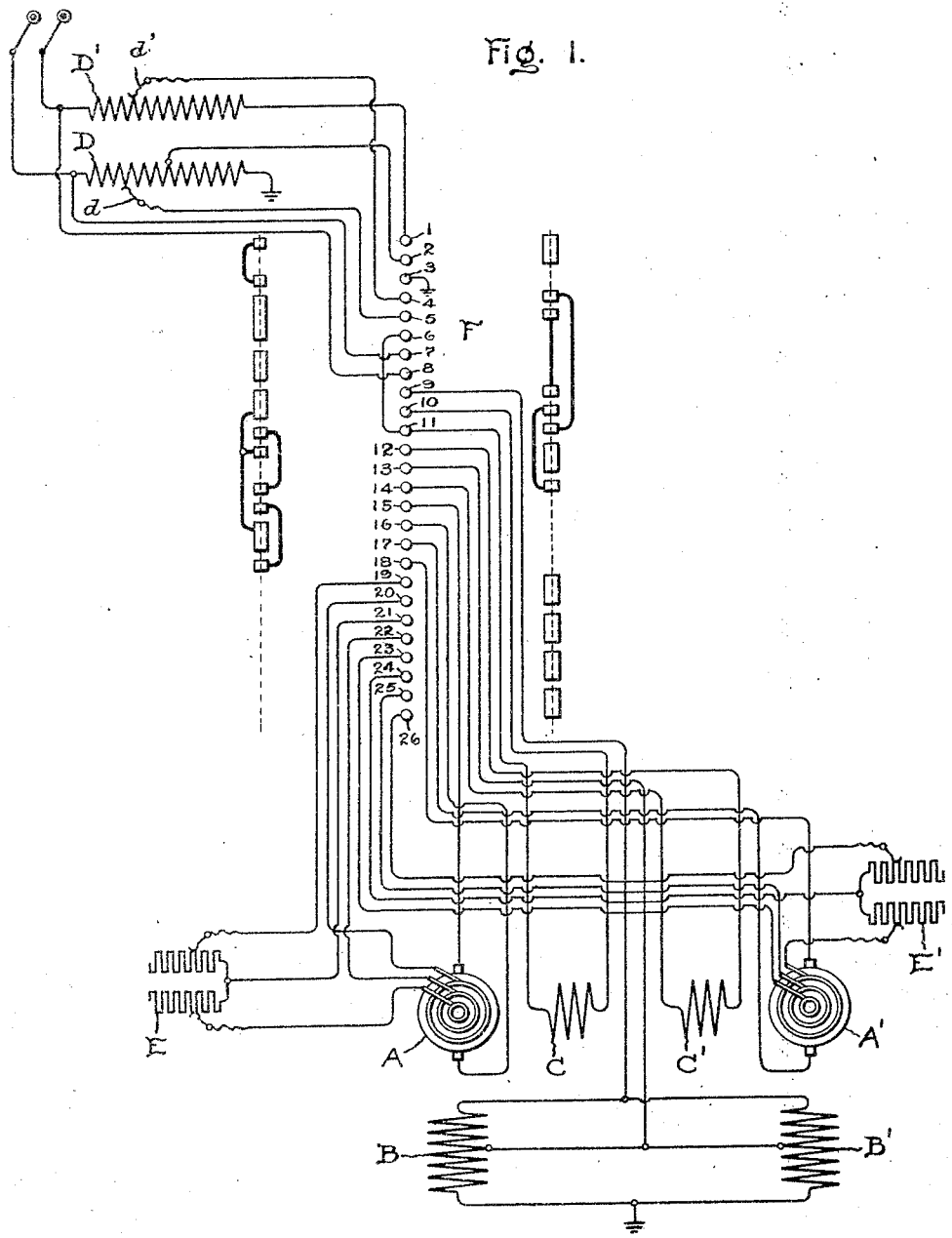

E. F. W. ALEXANDERSON.
ALTERNATING CURRENT MOTOR CONTROL.
APPLICATION FILED JAN. 6, 1910.
1,098,656.
Patented June 2, 1914.
2 SHEETS—SHEET 2.
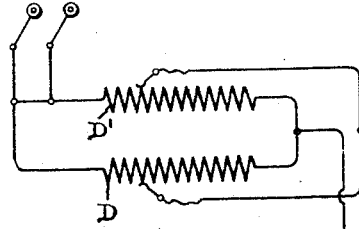
Fig. 2.
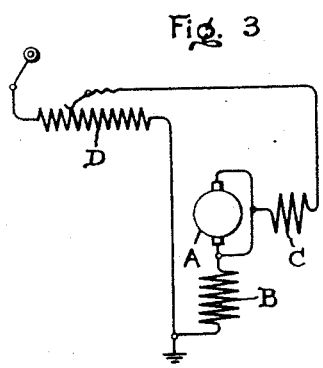
Fig. 3.
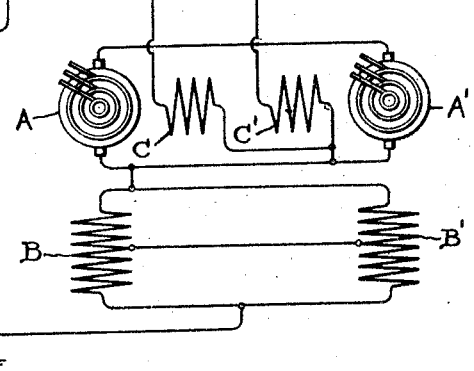
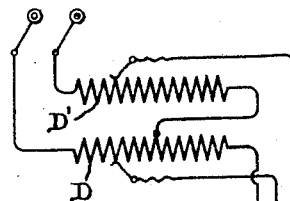
Fig. 4.
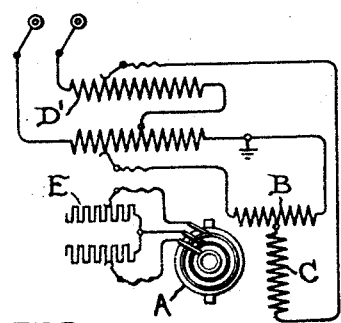
Fig. 5.
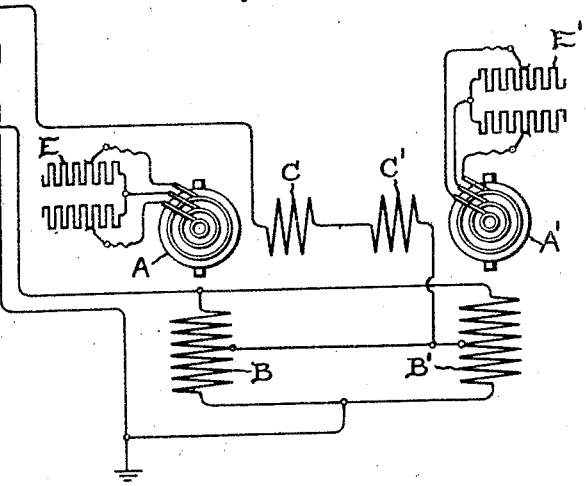
WITNESSES:
Lester H. Fulmer.
J. Ellis Glen
INVENTOR
ERNST F. W. ALEXANDERSON.
BY Albert G. Davis
HIS ATTORNEY.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

ALTERNATING-CURRENT-MOTOR CONTROL.

1,098,656. Specification of Letters Patent. Patented June 2, 1914.

Application filed January 6, 1910. Serial No. 536,656.

*To all whom it may concern:*

Be it known that I, ERNST F. W. ALEXANDERSON, a citizen of the United States, residing at Schenectady, county of Schenectady, State of New York, have invented certain new and useful Improvements in Alternating-Current-Motor Control, of which the following is a specification.

My invention relates to the control of alternating current motors, and its object is to provide simple means whereby such motors may be operated efficiently on either single-phase or poly-phase currents.

For certain kinds of railway work, particularly where constant speed and the ability to brake electrically are required, a three-phase motor is especially suitable. For other kinds of service, as in yards where switches and cross-overs are numerous, three-phase operation may be objectionable, because of the difficulty of properly installing two trolley wires or working conductors in such locations. A control arrangement whereby the motors may be operated on either single-phase or poly-phase currents, so that in the yards and terminals single-phase currents may be employed, and on the main line, three-phase currents, presents great advantages in many cases.

My invention consists in providing such a control of the motors by providing their rotor windings both with commutators and collector rings, with means for establishing in a special manner single-phase connections for the stator windings of the motors and establishing the rotor circuits through the commutators for single-phase operation, and with means for establishing in a special manner poly-phase connections of the stator winding and establishing the rotor circuits through the collector rings for poly-phase operation.

My invention further comprises an arrangement whereby the supply transformer windings have their connections changed in a simple and efficient manner when the motor connections are changed as above specified.

My invention will be best understood by reference to the accompanying drawings, in which—

Figure 1 shows diagrammatically a pair of alternating current motors and transformer windings for supplying them provided with a transfer switch, arranged in accordance with my invention, for connecting the motors and transformer windings for single-phase or poly-phase operation; Fig. 2 is a diagram of the connections established by the transfer switch of Fig. 1 for single-phase operation; Fig. 3 is a simplified diagram, corresponding to Fig. 2, with but only one motor shown; Fig. 4 is a diagram of the connections established by the transfer switch of Fig. 1 for three-phase operation, and Fig. 5 is a simplification of Fig. 4 showing only one motor.

In the drawings, A and A' represent the rotor windings of a pair of motors each provided with commutator and collector rings. The motors are provided with stator windings B and B', respectively, and also with windings C and C', which are displaced electrically 90 degrees from the windings B and B'.

D and D' represent transformer windings for supplying current to the motors.

E and E' represent resistances used in poly-phase operation.

F represents a transfer or commutating switch for changing the motor connections from single-phase to poly-phase. This switch is shown diagrammatically with its contacts developed on a plane surface embodying 26 contact fingers and two sets of movable contacts. In order to simplify the drawing the other controlling switches ordinarily employed are omitted.

For single-phase operation the switch F of Fig. 1 is moved so as to bring the left-hand row of movable contacts into engagement with the contact fingers. When this is done the connections of Fig. 2 are established. The left-hand terminals of the transformers D and D' are connected together at fingers 7 and 8 and the right-hand terminal of transformer winding D' is connected to ground at fingers 1 and 3, so that the two transformer windings are connected in parallel for single-phase operation. The upper terminals of the compensating windings B and B' are connected through contact fingers 9, 10 and 12 to the right-hand terminals of the windings C and C', while the left-hand terminals of these windings are connected together and to the movable contacts d and d' on the transformer windings through fingers 14, 11, 6, 5 and 4. The two rotor windings are short-circuited on each other through their commutators and through fingers 15, 18, 17 and 16. The circuits for the collector rings are open at fingers 19, 20, 21 and 22 for rotor A and fingers 23, 24, 25 and 26 for rotor A'. The connections thus established may be shown in simplified form for a single motor, as in Fig. 3. It will be seen that the armature winding is short-circuited so that the motor acts as a repulsion motor, the windings B and C being connected in series with each other and acting as inducing and exciting windings respectively. By inducing winding I mean a winding producing a magneto-motive force along the line of the commutator brushes. In Fig. 2 the compensating windings B and B' are connected in parallel with each other as are also the exciting windings C and C'.

For three-phase operation the switch F is moved to its other position thereby establishing the connections shown in Fig. 4. The right-hand terminal of transformer winding D' is connected to the middle terminal of winding D through fingers 1 and 2, thereby establishing the well known T connection, whereby the transformer windings are adapted for connection to a three-phase supply through the trolleys. The upper terminals of windings B and B' are now connected through fingers 9 and 5 to the contact d on transformer winding D. These windings are thus connected in parallel across a variable portion of the winding of transformer D. The middle terminals of these two windings B and B' are connected through contacts 13 and 12 to the right-hand terminal of winding C', the left hand terminal of which is connected through contacts 14 and 10 to the right-hand terminal of winding C, the left-hand terminal of which is connected through contacts 11 and 4 to the movable contact d' on transformer winding D'. The two windings C and C' are thus connected in series between the middle terminals of the windings B and B' and a point on winding D'. This, as is best shown in Fig. 5, establishes a T connection of the stator windings of the motors corresponding to the T connection of the transformer windings and adapting the stator connections for three-phase operation. The circuit of the commutator brushes is opened at contacts 15 and 16 for rotor A and 17 and 18 for rotor A', while through the collector rings the rotor winding A is connected through contacts 19 to 22 inclusive to resistances E, and the rotor winding of A' is connected through contacts 23 to 26 inclusive to resistances E'. The rotor windings are thus short-circuited through variable resistances, as in the ordinary induction motor operation, the connections, simplified for a single motor, being as shown in Fig. 5.

It has already been pointed out that with the single-phase connections shown in Fig. 2 the exciting windings C and C' of the two motors are connected in parallel. With the poly-phase connection shown in Fig. 4 these windings are connected in series. The reason for this is that the exciting winding of a single-phase commutator motor has a much smaller number of turns than the compensating winding, but by putting the two exciting windings of the motors in series while the inducing windings are maintained in parallel the ratio of the number of turns in the two circuits may be made approximately correct for three-phase operation with the T connection shown.

I do not desire to limit myself to the particular connections and arrangements of parts shown and described, but aim in the appended claims to cover all modifications which are within the scope of my invention.

What I claim as new and desire to secure by Letters Patent of the United States, is—

1. In combination with an alternating current motor for operation on both single-phase and three-phase currents, a pair of transformer windings for supplying said motor, means for connecting said windings in parallel and connecting said motor as a single-phase commutator motor and to said windings, and means for establishing a T connection for said windings and connecting said motor as a poly-phase induction motor and to said windings.

2. In combination with an alternating current motor having a rotor winding provided with both commutator and collector rings, a plurality of transformer windings for supplying said motor, means for establishing single-phase connections for said transformer windings and the stator winding of said motor and connecting together said windings and establishing the rotor circuit through the commutator, and means for establishing poly-phase connections for the transformer and stator windings and connecting together said windings and establishing the rotor circuit through the collector rings.

3. In combination with a pair of alternating current motors each having a rotor winding provided with both commutator and collector rings and two stator windings displaced from each other by ninety electrical degrees, means for establishing the rotor circuits through the commutators and connecting the stator windings of each motor as inducing and exciting windings respectively, the exciting windings of the two motors being connected in parallel, and means for establishing the rotor circuits through the collector rings and establishing a polyphase connection of the stator windings, the exciting windings of the two motors being connected in series.

In witness whereof, I have hereunto set my hand this 5th day of January, 1910.

ERNST F. W. ALEXANDERSON.

Witnesses:
BENJAMIN B. HULL,
HELEN ORFORD.